United States Patent [19]
Valfre

[11] 3,974,345
[45] Aug. 10, 1976

[54] NEGATIVE IMPEDANCE REPEATER WITH DOUBLE AMPLIFICATION, FOR TELEPHONE LINES

[76] Inventor: Cesare Valfré, Via Borgosesia 46 bis, 10145 Turin, Italy

[22] Filed: Nov. 29, 1974

[21] Appl. No.: 528,008

[30] Foreign Application Priority Data
Aug. 21, 1974 Austria .............................. 6824/74

[52] U.S. Cl. ...................... 179/170 G; 333/80 R
[51] Int. Cl.² ...................... H04B 3/16; H04B 3/36
[58] Field of Search .................. 179/170 G, 170 R; 330/61 A; 333/28 R, 80 R, 80 T

[56] References Cited
UNITED STATES PATENTS

| | | | |
|---|---|---|---|
| 2,855,575 | 10/1958 | Tamburelli .................. | 179/170 G |
| 3,024,324 | 3/1962 | Dimmer ...................... | 179/170 G |
| 3,503,002 | 3/1970 | Valfre ......................... | 179/170 G |
| 3,551,838 | 12/1970 | Valfre ......................... | 179/170 G |
| 3,860,767 | 1/1975 | Boucher et al. ............. | 179/170 G |

Primary Examiner—William C. Cooper
Assistant Examiner—Randall P. Myers

[57] ABSTRACT

A repeater for telephone lines, comprising two amplifier units serially connected and joined by an artificial line, the first unit having its input terminals connected to the secondary winding of a transformer of which the primary winding serves for connection of the repeater to the line, and the second unit having its output terminals connected to the primary winding of a second transformer of which the secondary winding is intended for connection of the repeater to the line.

22 Claims, 16 Drawing Figures

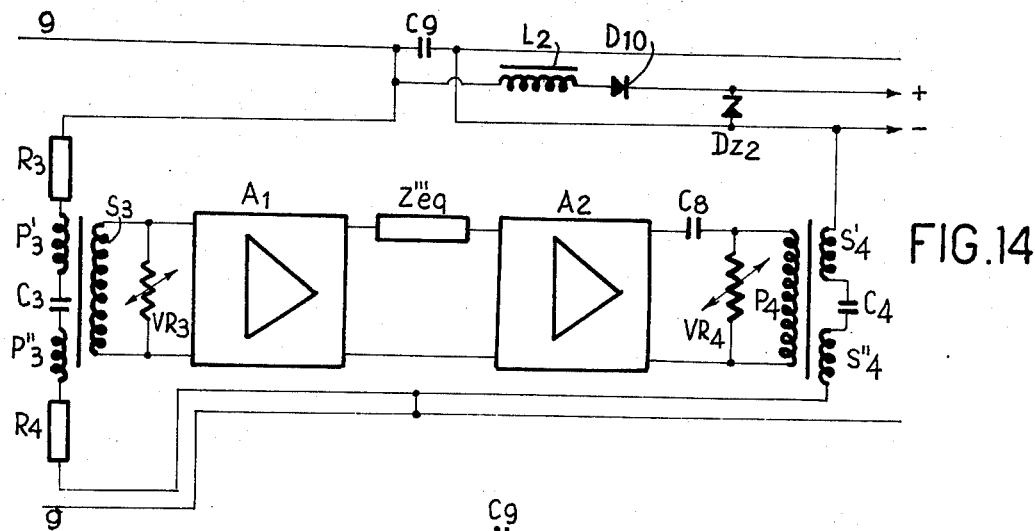
FIG.14
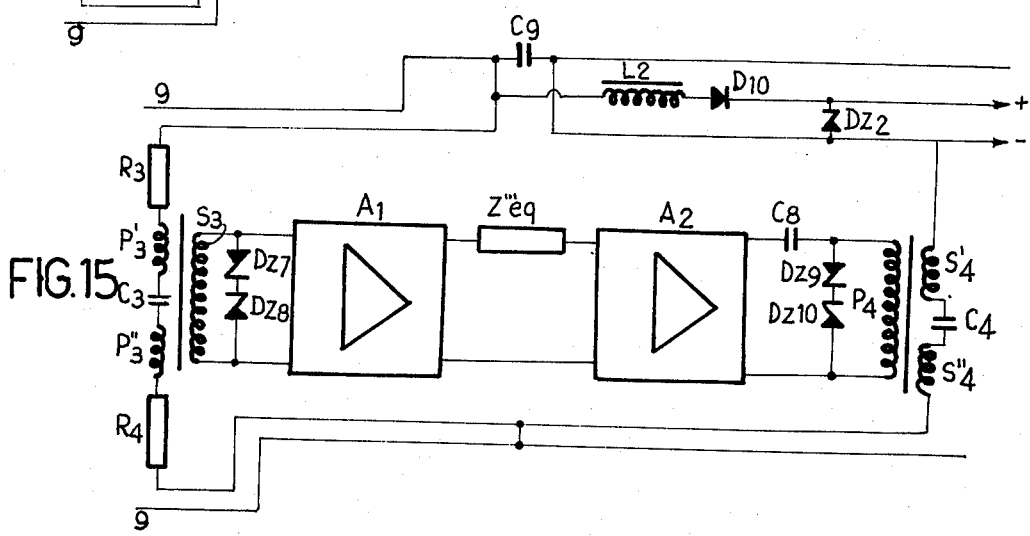
FIG.15
FIG.16
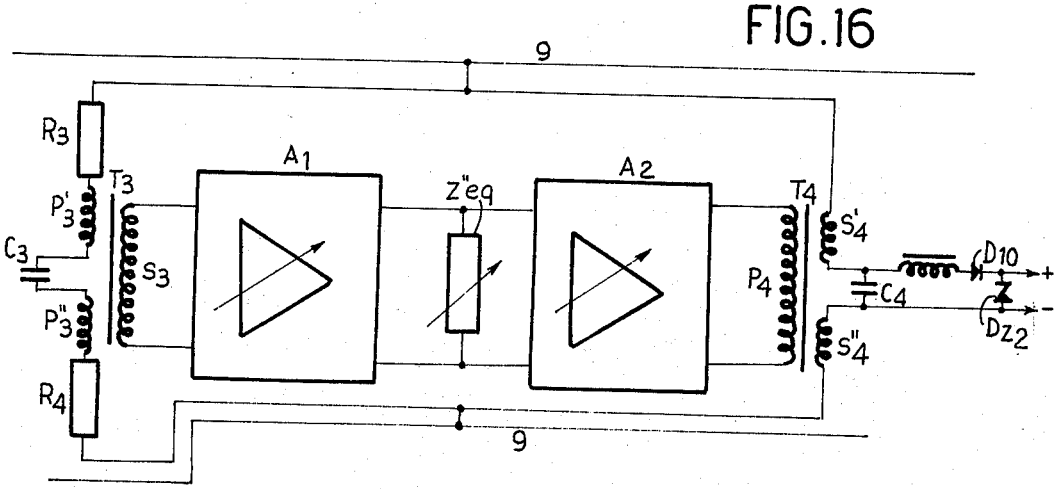

NEGATIVE IMPEDANCE REPEATER WITH DOUBLE AMPLIFICATION, FOR TELEPHONE LINES

FIELD OF THE INVENTION

The present invention relates to a negative, impedance repeater with double amplification, to be employed for amplifying telephone lines operating at voice frequency, more particularly two wire-telephone lines.

The Prior Art

It is known that, in order to compensate the attenuation of a telephone line, that is in order to raise the level of the phonic currents travelling along the line, the so-called negative impedance repeaters (or amplifiers) are used.

These devices comprise electric circuits having four terminals, of which two, called "output terminals," are loaded with passive impedances which appear at the other two terminals, called "input terminals", changed in sign and multiplied by a coefficient, called "conversion ratio."

There are essentially two types of negative impedance amplifiers or repeaters: the first type, called "series two terminal circuit," is normally connected in series with the two line wires, and the other type, called "shunt two terminal circuit," is generally connected in parallel between the two line wires. The connection of the repeater to the line is carried out by means of transformers.

Both types of repeaters are commonly used, but the more suitable solution is to use both repeaters together by suitably connecting the parallel repeater between the centers of the line windings of the series repeater.

A known embodiment of the series repeater employs two transformers, of which the first has its primary winding connected in series with the secondary winding of the other transformer, in such a way that the output voltage of the latter is in opposition of phase with the voltage of the primary winding of the first transformer, the two windings being connected in series on the line, whereas the secondary winding of the first transformer is connected to the input of an amplifier unit, and lastly the primary winding of the second transformer is connected to the output of the said amplifier unit.

Similarly, in a known embodiment of negative impedance repeater of the shunt type, two transformers are used, of which the first has its primary winding connected in parallel with the secondary winding of the second transformer, in such a way that the output current of the latter is in opposition of phase with the input current of the primary winding of the first transformer, and the assembly of the two windings is connected in parallel with the line, an amplifier unit being connected between the secondary winding of the first transformer and the primary winding of the second transformer.

These known repeaters employing a single amplifier unit have given good results, however it is possible to achieve performances which are further and considerably improved, by using the arrangement according to the present invention.

BRIEF SUMMARY OF THE INVENTION

A repeater according to the present invention is essentially characterized in that it comprises two amplifier units, serially connected and joined by an artificial line, more particularly an equalizing network. The first of the said amplifier units has its input terminals connected to the ends of the secondary winding of a first transformer of which the primary winding is intended for connection of the repeater to the line, whereas the second unit has its output terminals connected to the ends of the primary winding of a second transformer of which the secondary winding is connected to the line.

The equalizing network may be connected in series or in parallel between the output terminals of the first amplifier and the input terminals of the second amplifier.

According to a first embodiment of the invention the primary winding of the first transformer and the secondary winding of the second transformer are connected in series with each other and with the line.

According to another embodiment, the said windings are connected in parallel with each other and with the line.

According to yet another embodiment of the invention, the primary winding of the first transformer and the secondary winding of the second transformer are divided into a plurality of sections connected in series with the line wires in balanced way, and form two symmetrical centers to which the parallel of the primary winding of a third transformer and the secondary winding of a fourth transformer is connected, the said third transformer having its secondary winding connected to the input terminals of a third amplifier and the said fourth transformer having the primary winding connected to the output terminals of a fourth amplifier, serially connected to the third amplifier, on the connection between the third and fourth amplifiers there being arranged, in series or in parallel, an artificial line, more particularly an equalizing network.

THE DRAWINGS

Further characteristics of the invention will clearly result from the following description, with reference to the accompanying drawings, in which:

FIG. 14 is a modification of FIG. 10 using varistors as the protection device;

FIG. 15 is a modification of FIG. 10 using Zener diodes as the protection device, and FIG. 16 is a modification of FIG. 6 with the addition of a remote supply.

Figure 1:
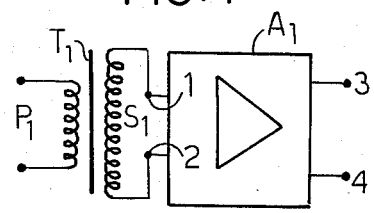
FIG. 1 is a block diagram of an amplifier unit of the device according to the invention.
Figure 2:
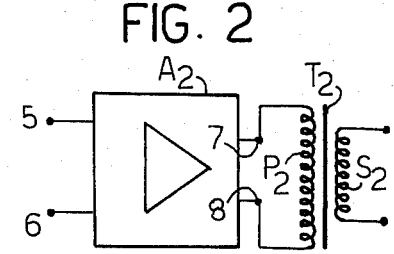
FIG. 2 is a block diagram of the second amplifier unit of the repeater according to the invention.

FIGS. 1 and 2 shown respectively the two assemblies which form the repeater according to the invention.

DETAIL DESCRIPTION OF THE INVENTION

According to FIG. 1, the input terminals 1, 2 of a amplifier $A_1$ are connected to the ends of the secondary windings $S_1$ of a transformer $T_1$ of which the primary winding $P_1$ is intended for connection to the telephone line; the output terminals 3, 4 of $A_1$ serve for connection with the second assembly of the repeater, shown in FIG. 2.

According to FIG. 2, the output terminals 7, 8 of an amplifier $A_2$ are connected to the ends of the primary winding $P_2$ of a transformer $T_2$, of which the secondary winding $S_2$ serves for connection to the telephone line; the input terminals 5, 6 of $A_2$ serve for connection with the unit of FIG. 1.

In the complete repeater (FIGS. 3 to 11) the two amplifiers $A_1$, $A_2$ are cascade connected to each other, and their connection has inserted thereon an artificial line, formed by an equalizing network.

The repeater may be connected in series or in parallel with the telephone line.

Figure 3:
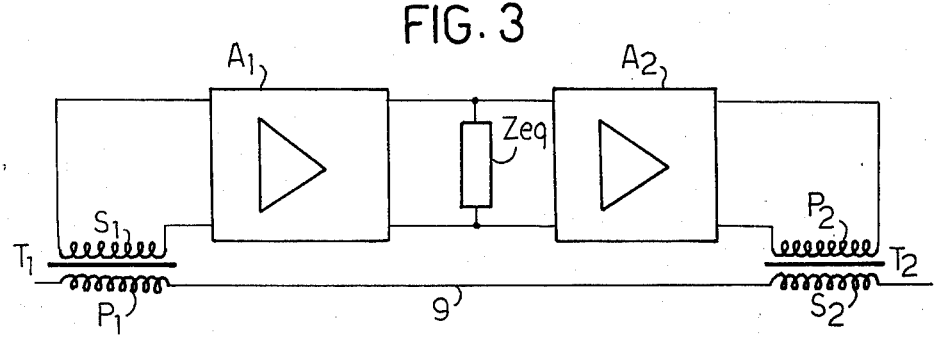
FIG. 3 is a block diagram of a series repeater according to the invention.
Figure 4:
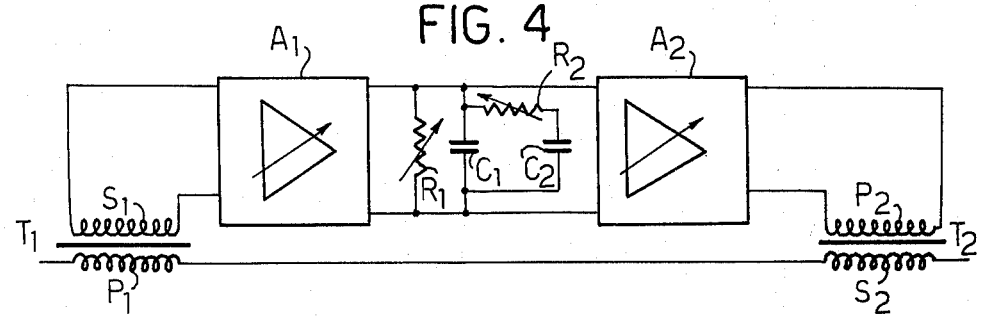
FIG. 4 is a diagram similar to FIG. 3, and shows a particular embodiment of the equalizing network.
Figure 5:
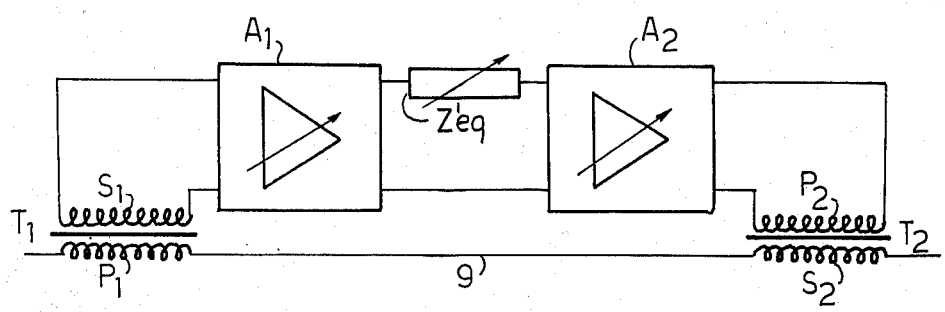
FIG. 5 is a diagram of another embodiment of a series repeater.

FIGS. 3 to 5 show some possible embodiments of the series two terminal circuit. As shown, the primary winding $P_1$ of transformer $T_1$ is connected in series with a line wire 9, to which also the secondary winding $S_2$ of transformer $T_2$ is serially connected. Between the secondary winding $S_1$ of $T_1$ and the primary winding $P_2$ of $T_2$ there is connected the cascade of the two amplifier units $A_1$, $A_2$.

The connection between the said units $A_1$ and $A_2$ has inserted thereon the equalizing network, which may be connected in parallel (FIG. 3) or in series (FIG. 5). The equalizing networks are diagrammatically shown by their impedances $Z_{eq}$ FIG. 3) and $Z'_{eq}$ (FIG. 5) respectively.

If the equalizing network is inserted in parallel on the connection between $A_1$ and $A_2$, the amplifier $A_1$ must have very low input impedance and very high output impedance; the amplifier $A_2$ must have on the contrary very high impedance and very low output impedance. In this way $A_1$ essentially acts as amplifier of the line current and $A_2$ as amplifier of the voltage existing across $Z_{eq}$. The low input impedance of $A_1$ acts also so as to keep practically negligible the impedance presented by $T_1$ as line winding.

If the equalizing network is inserted in series to the connection between $A_1$ and $A_2$, these amplifiers must have a very low output impedance and respectively a very low input impedance. The input impedance of $A_1$ and the output impedance of $A_2$ are as in the case of equalizing network in parallel. Moreover the gain of $A_1$ and $A_2$, as well as $Z'_{eq}$, have to be variable.

With the arrangement shown in FIG. 3, the two amplifier units have, towards the line transformer, impedances which are substantially independent from the equalizing network, which could not be achieved with the known repeaters where an equalizing network was inserted in the feedback loop of a single amplifier unit.

An equalizing network $Z_{eq}$ arranged in parallel between $A_1$ and $A_2$ may be realized so as to allow to carry out its regulation only by means of potentiometers.

This is shown in FIG. 4, where the two amplifiers $A_1$, $A_2$ have variable gain and have arranged in parallel on their connection the parallel between a variable resistor $R_1$ and a capacitor $C_1$; to the armatures of $C_1$ is moreover connected the series of a second variable resistor $R_2$ and a second capacitor $C_2$.

If the resistance of $R_2$ and the capacitance of $C_2$ are both zero, the equalizing network is reduced to the parallel between $R_1$ and $C_1$, the regulation of which may be exactly replaced by the regulation of $R_1$ and of the gain of one of the amplifiers, carried out by means of potentiometers.

If $C_2$ is different from zero, the regulation of $C_2$ may be still carried out by potentiometers, provided that the said capacitor is realized as an operational amplifier with variable gain.

Figure 6:
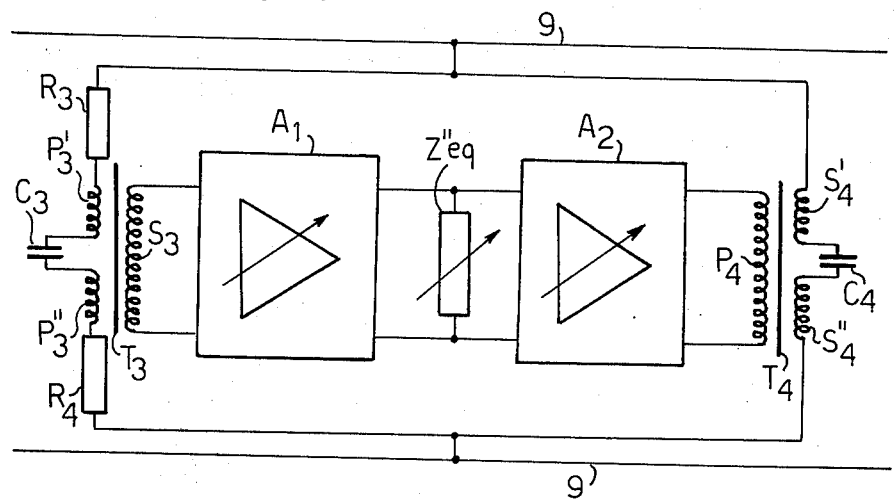
FIG. 6 shows a first embodiment of a parallel repeater according to the invention.
Figure 8:
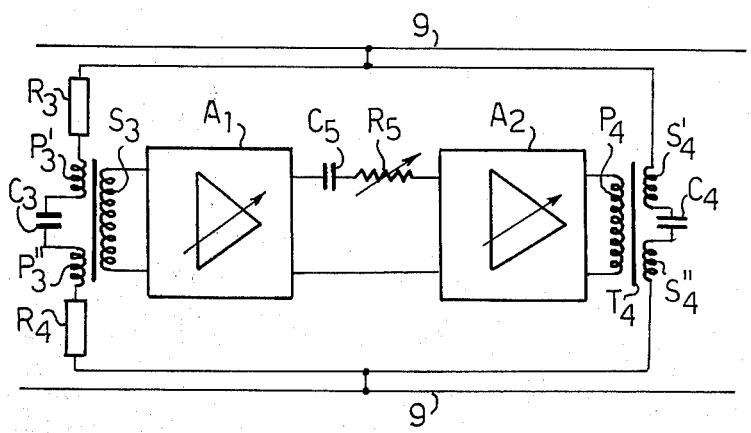
FIG. 8 is a diagram similar to FIG. 7 and slows a possible embodiment of the equalizing network of FIG. 7.

FIGS. 6 and 8 show some possible embodiments of the parallel two terminal circuit.

Figure 7:
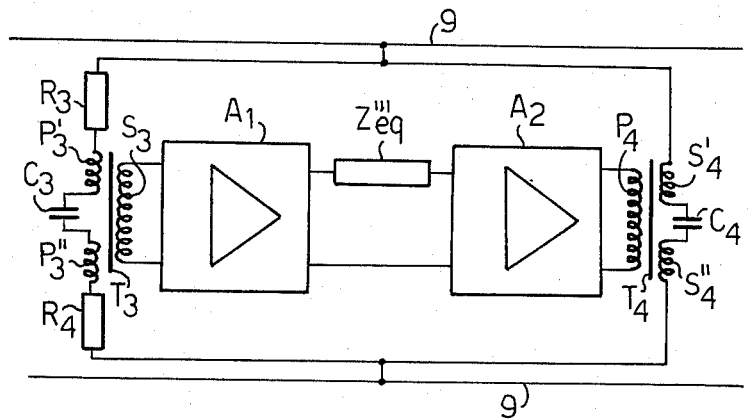
FIG. 7 shows a modified embodiment of the repeater of FIG. 6.

According to FIGS. 6 and 7, the primary winding of a transformer $T_3$, connected to the input of $A_1$, and the secondary winding of a transformer $T_4$, connected to the output of $A_2$, are connected in parallel with one another and with the line wires 9, and are each divided into two portions, $P_3'$, $P_3''$ and respectively $S_4'$, $S_4''$, separated by the capacitors $C_3$, $C_4$ which serve to prevent the short-circuit of the signalling currents through the windings $P_3'$, $P_3''$ and $S_4'$, $S_4''$. Moreover, resistors $R_3$, $R_4$ are inserted between $P_3'$ and respectively $P_3''$ and the line.

Between the secondary windings $S_3$ of $T_3$ and the primary winding $P_4$ of $T_4$, there is connected, as in the case of FIGS. 3 to 5, the cascade connection of the two amplifier units $A_1$, $A_2$, both having variable gain. The connection between $A_1$ and $A_2$ has inserted thereon the equalizing network, in parallel (FIG. 6) or in series (FIG. 7). In both cases the equalizing networks are diagrammatically shown by their impedances $Z''_{eq}$ (FIG. 6) and $Z'''_{eq}$ (FIG. 7).

The amplifier $A_1$ must have a very high input impedance, and the amplifier $A_2$ must have a very high output impedance.

In the case of equalizing network $Z''_{eq}$ in parallel (FIG. 6) also the output impedance of $A_1$ and the input impedance of $A_2$ must be very high, whereas in the case of the qualizing network $Z'''_{eq}$ in series, the output of $A_1$ and the input of $A_2$ must both have a very low impedance. If the very high impedance are considered infinite impedances, and the very low impedance are considered null impedances, in the repeater shown in FIG. 6 there will be, as negative impedance in parallel with the line, the inverse of $Z''_{eq}$, multiplied by a coefficient and changed in sign, whereas in the repeater of FIG. 7 the negative impedance in parallel with the line will be given by $Z'''_{eq}$ multiplied by a coefficient and changed in sign.

The resistances $R_3$, $R_4$ in series with the primary winding of $T_3$, which resistances may possibly be zero, allow to increase the impedances introduced by $T_3$ in parallel with the line, so that the impedance of $T_3$, and therefore the size thereof, may be reduced. The impedance matching between $T_3$ and $A_1$ will then be improved by reducing the input impedance of $A_1$.

Also in the case of the parallel two terminal circuit, with an equalizing network connected in series between $A_1$ and $A_2$, it is possible to regulate the equalization only by means of potentiometers. This is shown in FIG. 8, where the equalizing network is formed by the series between the capacitor $C_5$ and the resistor $R_5$, and where both the resistance of $R_5$ and the gain of one of the two amplifier units $A_1$, $A_2$ may be rendered adjustable by means of potentiometers.

Also in the case of parallel repeater, if the equalizing networks comprise more capacitors, in order to carry out the regulations only by means of potentiometers it is necessary to employ operational amplifiers with variable gain as variable capacitors.

Also with the repeaters according to the invention it is possible to connect together on the line a series two terminal circuit and a parallel two terminal circuit so as to realize a four pole-repeater. A series two teminal circuit modified to this end is shown in FIG. 9, where the transformers $TR_1$, $TR_2$ (corresponding to transformers $T_1$, $T_2$ of FIGS. 3 to 5) have their line windings interconnected and divided into several sections $AL_1$, $AL_2$, $AL_3$, $AL_4$ connected in a balanced way in series with the two line wires 9 and forming two central points $X_1$, $X_2$ to which the parallel two terminal circuit may be connected.

Figure 9:
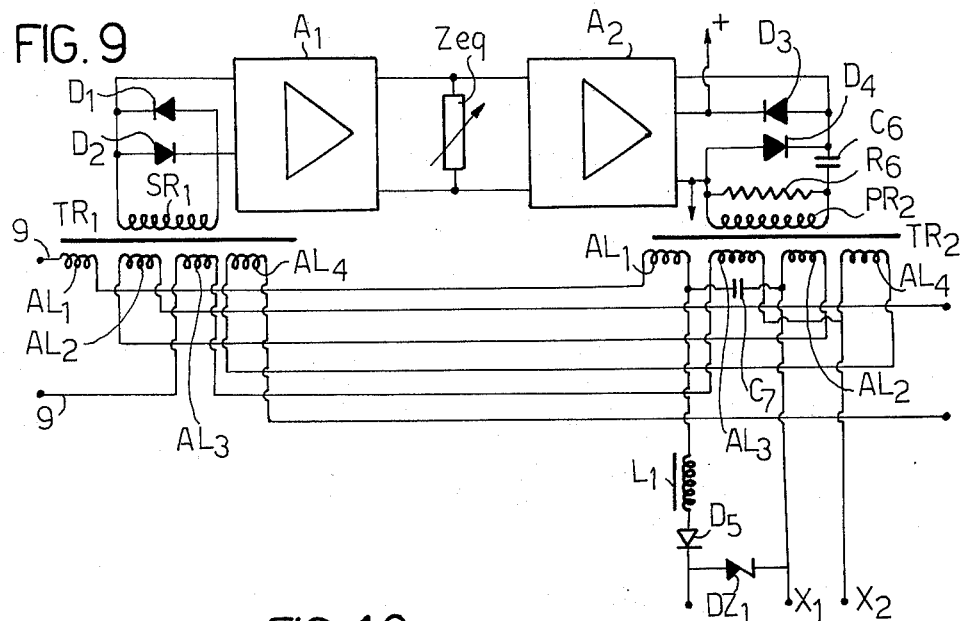
FIG. 9 shows a series repeater modified in view of its employ together with a parallel repeater.

FIG. 9 shows also the elements necessary for protecting the repeater against the overvoltages and for allowing the remote supply of the repeater.

The protection against the overvoltages at the input is provided by the diodes $D_1$, $D_2$, connected, in parallel to each other and with opposed polarity, in parallel to the secondary windings $SR_1$ of transformer $TR_1$. Two other diodes $D_3$, $D_4$ are connected between the output terminal in a.c. of the amplifier and the poles of the d.c. supply, the first of the said diodes having the anode connected with the positive pole and the second having the anode connected to the negative pole of the said supply.

The diodes $D_1$, $D_2$ act as limiters which limit the input voltage of the repeater to the value of their threshold voltage; the diodes $D_3$, $D_4$, normally in cut-off, when become conductive prevent the voltage of the output terminal in a.c. from exceeding the supply voltage and prevent therefore the output voltage from changing in sign.

Further, in parallel with the primary winding $PR_2$ of the transformer $TR_2$ there is a resistor $R_6$ which has the function to reduce the line attenuation when the repeater is out, and in series to this winding, between $R_6$ and the common point of $D_3$ and $D_4$ there is a capacitor $C_6$ which has the function to reduce the flowing of a call current at industrial frequency, if any. The same FIG. 9 shows the circuit for a possible remote supply of the repeater. Such a circuit comprises the capacitor $C_7$, in series with one of the line windings and across which the voltage for the remote supply of the repeater is taken; $C_7$ has connected in series the inductance $L_1$ and the rectifier $D_5$, and has in parallel the Zener diode $DZ_1$ at the ends of which the voltage necessary for the remote supply is provided.

The inductance $L_1$ is intended for blocking pulses of over-current due to external inductions, whereas the rectifier $D_5$ prevent the supply current from casually changing in sign with consequent fusing of the transistors forming the amplifiers $A_1$ and $A_2$.

Figure 10:
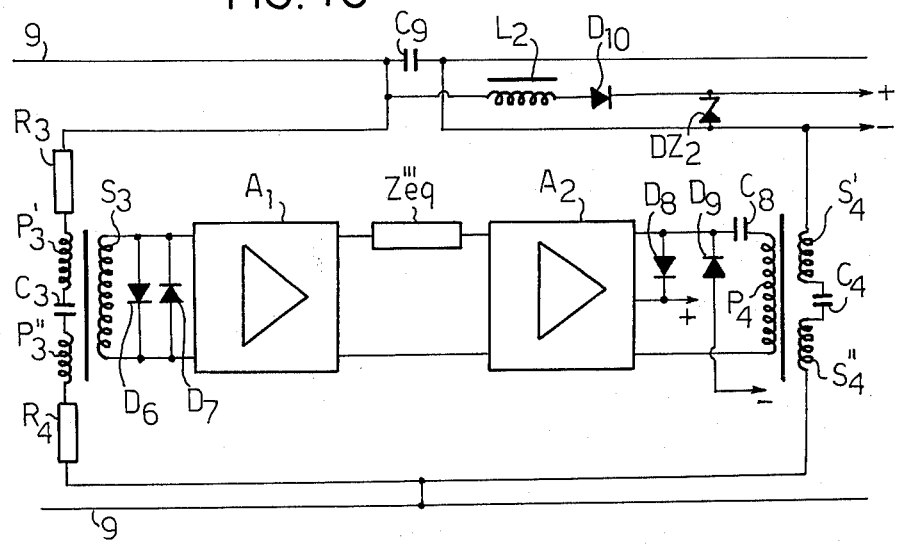
FIG. 10 shows a modified parallel repeater.

FIG. 10 shows a shunt two terminal circuit provided with protection against the overvoltages and with a circuit for remote supply.

As regards the protection against the overvoltages, it is shown that the secondary winding $S_3$ of the transformer $TR_1$ has connected in parallel therewith the diodes $D_6$, $D_7$ connected respectively as the diodes $D_2$ and $D_1$ of the series two terminal circuit and the a.c. output of amplifier $A_2$ has connected thereto the diodes $D_8$, $D_9$ corresponding to the diodes $D_3$, $D_4$ of the series two terminal circuit.

The primary winding $P_4$ of $T_4$ has moreover in series therewith the capacitor $C_8$ for reducing the flowing of the call current at industrial frequency, if any.

The circuit for remote supply of the shunt two terminal circuit comprises the capacitor $C_9$ in series with the connection between $P_3'$ and $S_4'$ and to said capacitor are connected in series the inductance $L_2$ and the rectifier $D_{10}$ and in parallel the Zener Diode $DZ_2$. The functions of these elements are the same as the functions of the corresponding elements in the series two terminal circuit.

Figure 11:
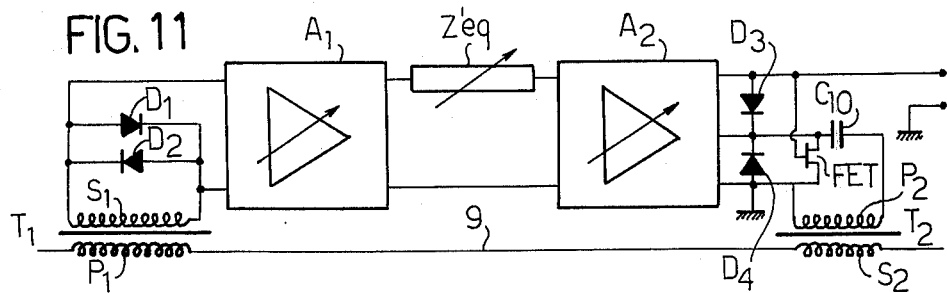
FIG. 11 shows a modified embodiment of the repeater of FIG. 9.
Figure 12:
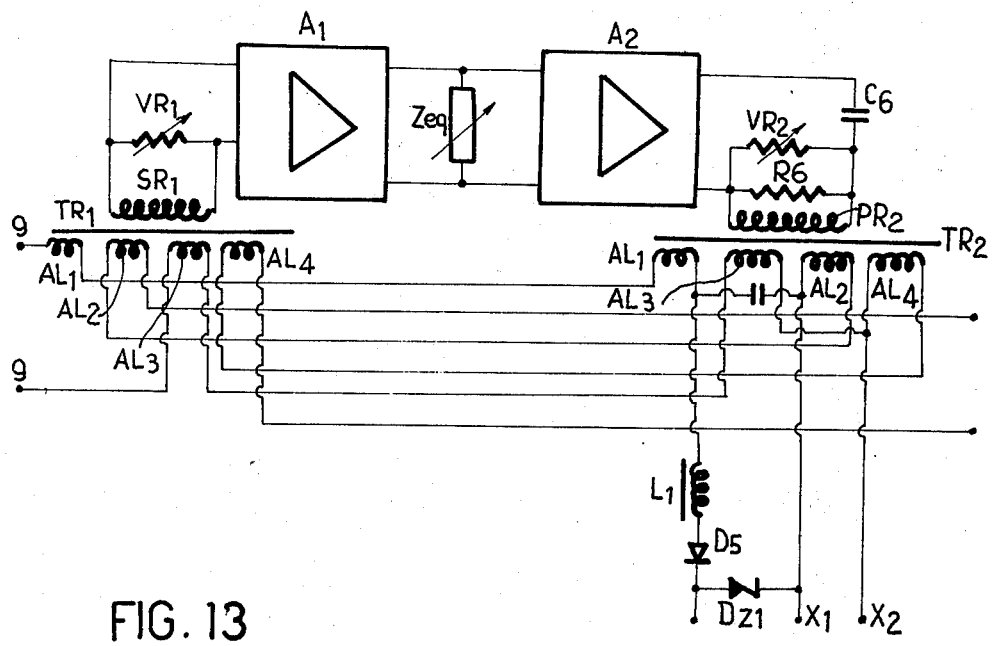
FIG. 12 shows a modification of FIG. 9 utilizing varistors in place of the diodes as the protection devices.
Figure 13:
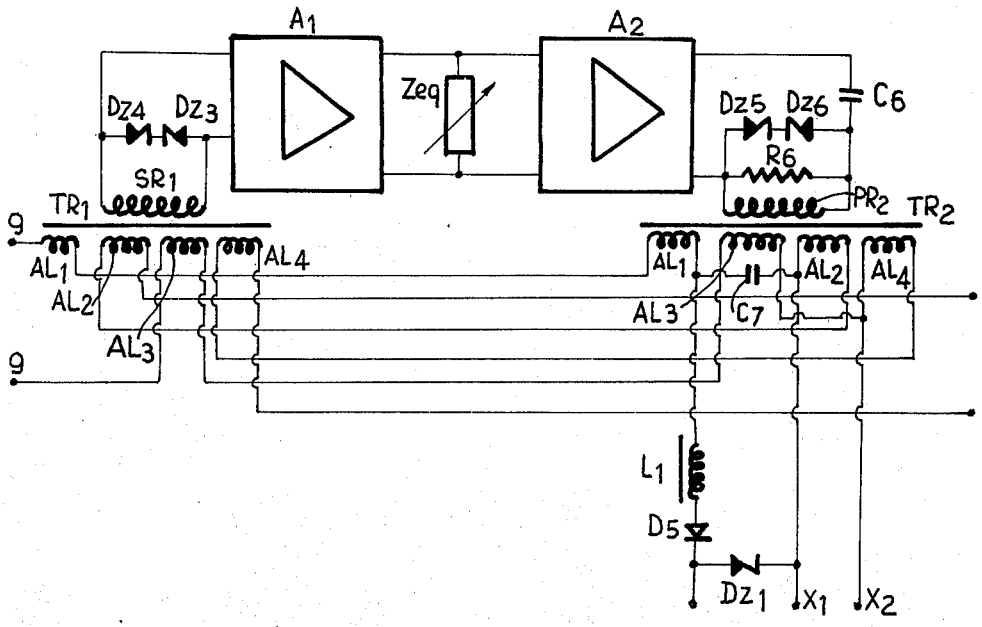
FIG. 13 shows a modification of FIG. 9 utilizing Zener diodes as the protection device.

Lastly FIG. 11 shows a further modified embodiment of the series two terminal circuit in which the reduction of the repeater attenuation created by the repeater in the line when the repeater is not operating is provided by a field effect transistor FET of which the base is connected to the hot terminal of the d.c. supply, whereas the drain is connected to the a.c. output of the amplifier and the source is grounded. The repeater of FIG. 11 still comprises the diodes $D_1$, $D_2$, $D_3$, $D_4$ for protection against the overvoltages and a capacitor $C_{10}$ in series to the connection of $P_2$ with the drain of the transistor FET in order to limit the call current at industrial frequency. For sake of simplicity of the drawing the circuit for remote supply has not been shown.

With a device such as that descried, by suitably choosing the characteristics of the transformers and of the amplifiers forming the two units of the repeater according to the invention, so as to obtain an integration as great as possible between transformers and amplifiers, it is possible to optimize certain characteristics, such as the cost of the repeater, or to achieve a compromise as good as possible between two characteristics, such as for instance the cost and the size. Moreover, the use of two amplifying units allows considerably to improve the performances of other components of the repeater, as well as to reduce the cost thereof, and this makes up for the apparent increase in the cost due to the doubling of the amplifier units. In particular if the amplifier units are made as linear integrated circuits their cost may be less than 0.50 Dollars.

It is self evident that the above description is given only by way of non limitative example, changes and modifications being possible without departing from the scope of the invention.

Thus for instance in the diagrams of FIGG. 9 to 11 the diodes $D_1 - D_4$ and $D_6 - D_9$ for protection against the over-voltages could be replaced by varistors, or by Zener diodes acting as limiters.

According to another variant embodiment, in the parallel repeater it is possible to take the voltage for remote supply across at least one of the blocking capacitors connected in the line windings of the transformers, instead of taking said voltage across the capacitor in series with the line.

What is claimed is:

1. A negative impedance repeater for telephone lines operating at voice frequency, which comprises a first and a second amplifier unit serially connected, an equalizing network electrically coupled between the output of the first amplifier unit and the input of the second amplifier unit, the said first amplifier unit having its input terminals connected to the secondary winding of a first transformer the primary winding of which is connected to the telephone line, and the said second amplifier unit having the output terminals connected to the ends of the primary winding of a second transformer the secondary winding of which is connected to the said telephone line, the said primary winding of the first transformer and the secondary winding of the second transformer being electrically interconnected with each other and with the telephone line.

2. A repeater according to claim 1, wherein the said equalizing network is connected in series between the output of the first amplifier unit and the input of the second amplifier unit.

3. A repeater according to claim 1, wherein the said equalizing network is connected in parallel between the output of the first amplifier unit and the input of the second amplifier unit.

4. A repeater according to claim 1, wherein the input terminals of the first amplifier unit and the output terminals of the second amplifier unit have connected thereto means for protection against overvoltages coming from the line.

5. A repeater according to claim 4, wherein the said protecting means comprise, for the first amplfier unit two rectifiers connected in push - pull arrangement with each other and in parallel across the said input terminals of said first amplifier unit.

6. A repeater according to claim 4, wherein the protecting means for the said second amplifier unit comprise two rectifiers of which the first is connected to the a.c. output terminal of the amplifier unit and to a pole of the voltage supply, and the second is connected between the said output terminal and the other pole of the voltage supply, the polarity of the two rectifiers being such that they are normally in cut off position.

7. A repeater according to claim 4, wherein the said protecting means comprise varistors.

8. A repeater according to claim 4, wherein the said protecting means comprise Zener diodes acting as limiters.

9. A repeater according to claim 1, wherein the primary winding of the said second transformer has connected in series thereto a capacitor in order to limit the flow of a call current at industrial frequency.

10. A repeater according to claim 1, wherein the primary winding of the said first transformer and the secondary winding of the said second transformer are connected in series to each other and to the line.

11. A repeater according to claim 10, wherein in series with one of the said primary winding of the first transformer and the secondary winding of the second transformer there is connected a capacitor across which a voltage for remote supply is applied.

12. A repeater according to claim 11, wherein the said capacitor is connected in parallel with a Zener diode and connected in series between said capacitor and said Zener diode there further comprises an inductance and a rectifier, whereby the said voltage for remote supply is applied across the said capacitor.

13. A repeater according to claim 10, wherein one of the said windings is connected to means for limiting the attenuation of the repeater when it is out of operation.

14. A repeater according to claim 13, wherein the said limiting means comprise a resistor in parallel with the said primary winding of the second transformer.

15. A repeater according to claim 13, wherein the said limiting means comprise a field effect transistor connected also to the a.c. output of the second amplifier unit and to the poles of the voltage supply.

16. A repeater according to claim 1, wherein the said primary winding of the first transformer and the said secondary winding of the second transformer are connected in parallel with each other and with the line.

17. A repeater according to claim 16, wherein each of the said primary winding of the second transformer and the said secondary winding of the second transformer is interrupted by a blocking capacitor.

18. A repeater according to claim 16, wherein a resistor is connected in series to the said primary winding towards each line wire.

19. A repeater according to claim 16, wherein between one end of the said primary winding and one end of the said secondary winding connected to a common line wire there is arranged, in series with the said wire, a capacitor across which a voltage for remote supply of the repeater may be applied.

20. A repeater according to claim 19, wherein the said capacitor is connected in series with an inductance and a rectifier and in parallel with a Zener diode, by means of which components it is possible to apply the voltage for remote supply across the said capacitor.

21. A repeater according to claim 17, wherein at least one of the said blocking capacitors is connected in series with an inductance and a rectifier and in parallel with a Zener diode, through which the voltage for remote supply may be taken across the said capacitor.

22. A repeater according to claim 1, wherein the said primary windig of the first transformer and the said secondary winding of the second transformer are divided into a plurality of sections one half of which are serially connected to one of the line wires and the other half of which are in series with the other one of the line wires so as to form two equal half-windings on each of the two line wires, said plurality of sections including two center points which have connected thereto in parallel the primary winding of a third transformer and the secondary winding of a fourth transformer, these last mentioned primary and secondary windings being interrupted by blocking capacitors and this last mentioned primary winding being connected to each line wire through a resistor, the said third transformer having its secondary winding connected to the input terminals of a third amplifier unit and the said fourth transformer having the primary winding connected to the output terminals of a fourth amplifier unit, the said third and fourth amplifier units being cascade connected to each other, and an equalizing network being electrically connected between the output of said third amplifier and the input of said fourth amplifier units.

* * * * *